United States Patent [19]

Takahashi

[11] Patent Number: 4,856,291

[45] Date of Patent: Aug. 15, 1989

[54] AIR CONDITIONING SYSTEM FOR AUTOMOTIVE VEHICLES

[75] Inventor: Tadahiro Takahashi, Konan, Japan

[73] Assignee: Diesel Kiki Co., Ltd., Tokyo, Japan

[21] Appl. No.: 289,839

[22] Filed: Dec. 27, 1988

[30] Foreign Application Priority Data

Dec. 28, 1987 [JP] Japan .............................. 62-336370

[51] Int. Cl.⁴ ............................................ F25B 41/04
[52] U.S. Cl. .................................... 62/217; 62/228.4; 62/323.4
[58] Field of Search ...................... 62/217, 323.4, 228.4

[56] References Cited

U.S. PATENT DOCUMENTS

| | | | |
|---|---|---|---|
| 4,646,534 | 3/1987 | Russell | 62/217 X |
| 4,691,526 | 9/1987 | Kobayashi et al. | 62/217 |
| 4,789,025 | 12/1988 | Brandemuehl et al. | 62/217 X |

Primary Examiner—William E. Wayner
Attorney, Agent, or Firm—Charles S. McGuire

[57] ABSTRACT

In an air conditioning system for automotive vehicles, a thermal load on the system is detected, and a desired value of suction pressure of refrigerant gas to a variable capacity type compressor is calculated on the basis of the detected thermal load, in accordance with a predetermined suction-pressure vs. thermal-load characteristic. The suction pressure is controlled on the basis of the calculated desired suction-pressure value. A value of torque required for driving the compressor is calculated on the basis of the calculated suction pressure, on the basis of the detected thermal load in accordance with a predetermined required-driving-torque vs. suction-pressure characteristic. Engine rotational speed at idling is set on the basis of the calculated torque value.

6 Claims, 7 Drawing Sheets

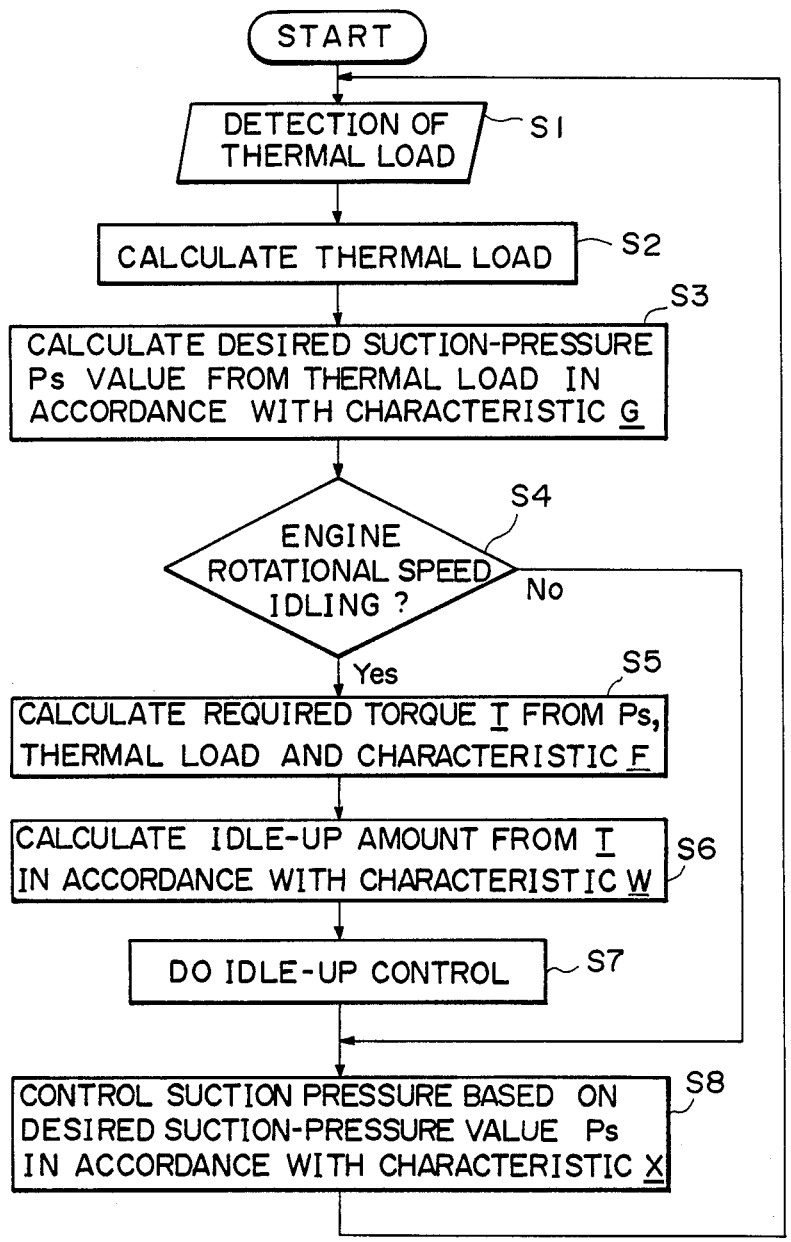

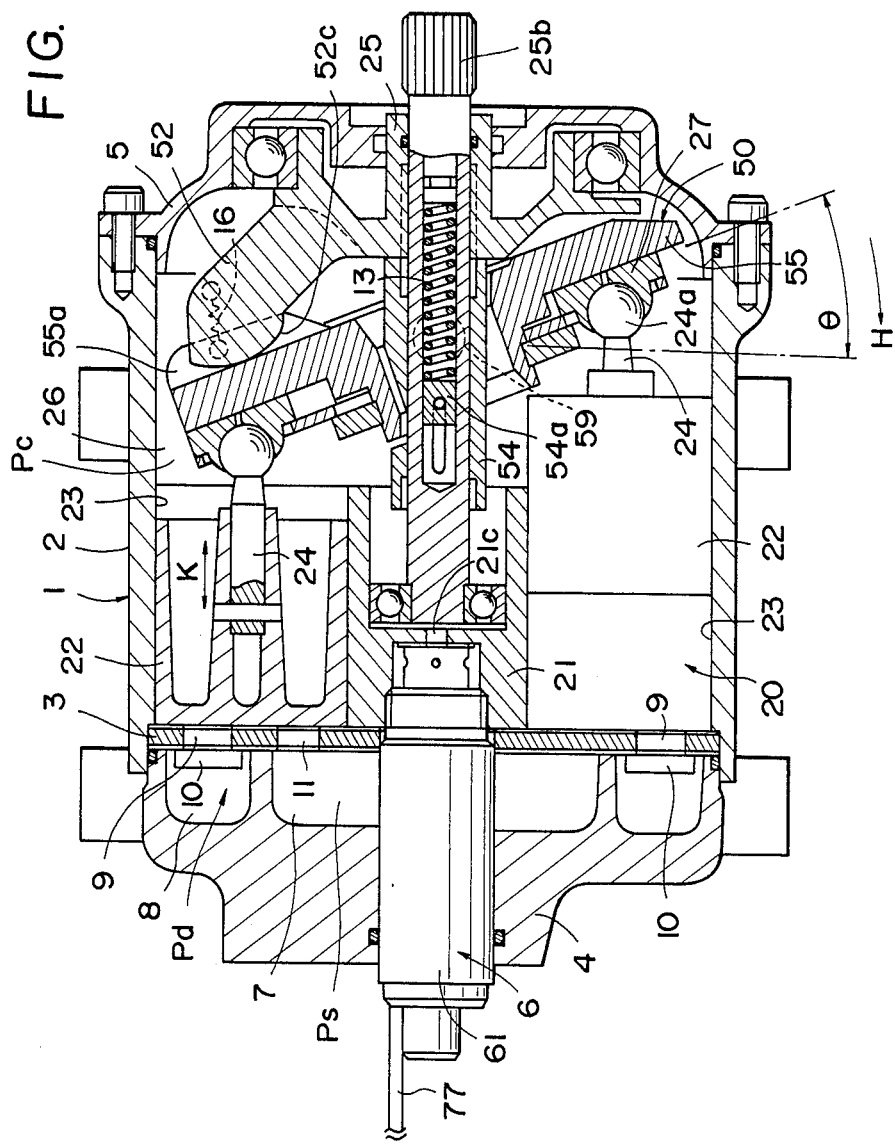

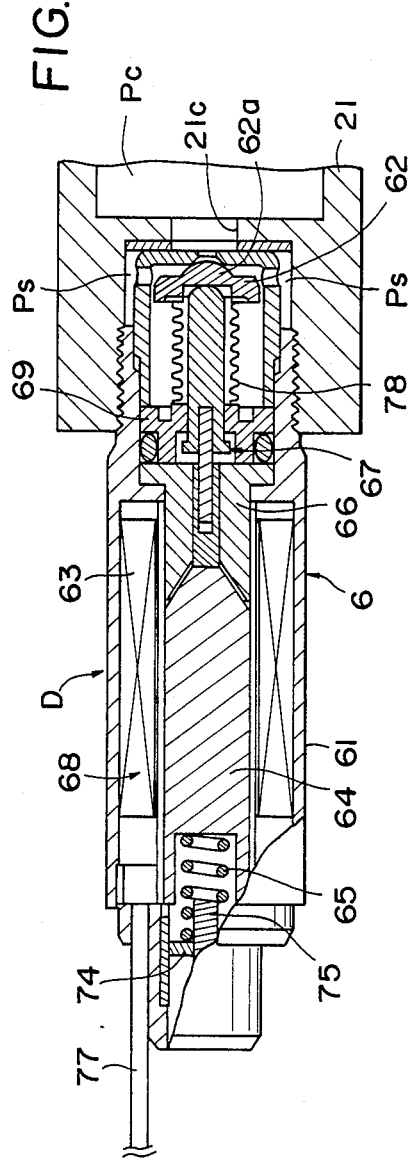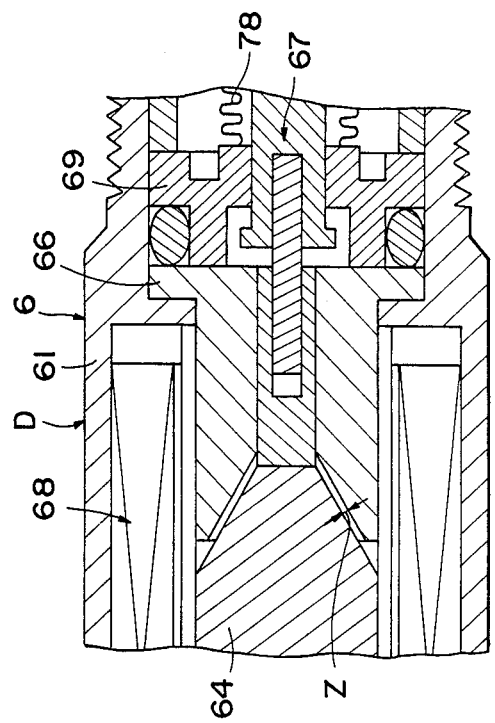

1

AIR CONDITIONING SYSTEM FOR AUTOMOTIVE VEHICLES

BACKGROUND OF THE INVENTION

This invention relates to an air conditioning system for automotive vehicles, for regulating temperature, humidity and so on within a vehicle compartment.

In a conventional air conditioning system for automotive vehicles in general, the refrigerating circuit is composed of a compressor 1, a condenser 81, an evaporator 80, a liquid tank 83 and so on, as shown in FIG. 1.

In recent years, a capacity-controlled type compressor has been spreading as the compressor 1. According to the capacity-controlled type compressor, the capacity of the compressor can be controlled linearly in proportion to a thermal load on the system, so that the compressor can sufficiently cope with the thermal load. Thus, it is possible to enhance the cooling feeling. Moreover, the compressor 1 is not so frequently turned on and off as a fixed capacity type compressor, and chance shocks due to turning-on and -off of the compressor, which conventionally occurred at cycling control, are not frequently applied to an engine, or if any, such shocks are small, so that the drivability can be improved. As an example of the compressor of this capacity-controlled type, a compressor of wobble-plate type is known, in which the angle of inclination $\theta$ of the wobble plate is varied to control the refrigerant suction pressure Ps of the compressor 1, thereby automatically adjusting the capacity of the compressor in response to the thermal load, etc.

Specifically, the compressor 1 is provided with a suction-pressure control device D as suction-pressure charging means including an electromagnetic actuator 68. The suction-pressure control device D is controlled by an external electrical control signal outputted from thermal-load detecting means S, thereby correcting the suction pressure of the compressor. In this connection, a fast-idle control device (F.I.C.D.) is known, which operates to raise the engine rotational speed by a predetermined value when the compressor is driven under such a condition that the engine is in an idling state. According to the fast-idle control device, however, the engine rotational speed is raised by a constant amount regardless of the capacity of the compressor.

In the conventional air conditioning system for automotive vehicles, the capacity of the compressor and the rotational speed of the engine are controlled in a manner described above. Accordingly, the engine rotational speed is raised uniformly, even if the compressor is set to a low capacity so that torque required for driving the compressor is lowered. That is, when the required driving torque for the compressor is low, the engine rotational speed becomes excessively high relative to the required driving torque, which is not preferable from the viewpoint of power saving. On the other hand, when the compressor is set to a high capacity, and the required driving torque for the compressor increases accordingly, the torque becomes insufficient because the engine rotational speed is raised uniformly. Thus, there is the possibility that the engine stalls.

SUMMARY OF THE INVENTION

It is the object of the invention to provide an air conditioning system for automotive vehicles, in which even at idling of the engine, the engine rotational speed can be set in compliance with the capacity of the compressor, i.e. the desired value of suction pressure of the compressor, to thereby obtain power saving and prevent engine stalling.

According to the invention, there is provided an air conditioning system for an automotive vehicle having an engine installed therein, the air conditioning system having a variable capacity type compressor, thermal-load detecting means for detecting a thermal load on the system, suction-pressure arithmetic means for calculating a desired value of suction pressure of the compressor on the basis of an output from the thermal-load detecting means in accordance with a predetermined suction-pressure vs. thermal-load characteristic, suction-pressure changing means for changing the suction pressure of the compressor, and suction-pressure control means for controlling the suction-pressure changing means on the basis of an output from the suction-pressure arithmetic means.

The air conditioning system for an automotive vehicle according to the invention is characterized by an improvement comprising:

required-driving-torque arithmetic means for calculating a value of torque required for driving the compressor, on the basis of the output from the suction-pressure arithmetic means and the detected thermal load in accordance with a predetermined required-driving-torque vs. suction-pressure characteristic; and idle-up control means for setting the rotational speed of the engine at idling on the basis of an output from the required-driving-torque arithmetic means.

Preferably, the suction-pressure vs. thermal-load characteristic may be such that as the thermal load increases, the desired suction-pressure value decreases.

More preferably, the required-driving-torque vs. suction-pressure characteristic may be such that as the desired suction-pressure value increases, the value of torque required for driving the compressor decreases, and that as the thermal load increases, the value of torque required for driving the compressor increases.

Further preferably, the idle-up control means may set the rotational speed of the engine at idling to higher values as the value of torque required for driving the compressor increases.

The above and other objects, features and advantages of the invention will become more apparent from the ensuing detailed description taken in conjunction with the accompanying drawings

BRIEF DESCRIPTION OF THE DRAWINGS

FIG. 3 is a flowchart of a program for controlling the air conditioning system illustrated in FIG. 2;

FIG. 9 is a vertical longitudinal cross-sectional view of the compressor illustrated in FIG. 8;

FIG. 10 is a fragmentary cross-sectional view of a suction-pressure control mechanism incorporated in the compressor illustrated in FIGS. 8 and 9; and FIG. 11 is a fragmentary enlarged cross-sectional view of the suction-pressure control mechanism illustrated in FIG. 10.

DETAILED DESCRIPTION

Figure 1:
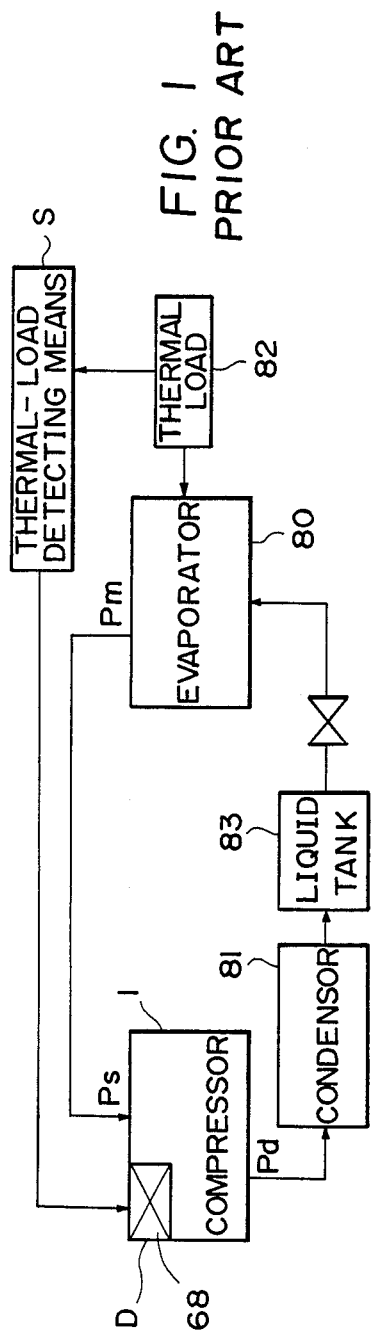
FIG. 1 is a block diagram showing a conventional air conditioning system for automotive vehicles.

The invention will be described below with reference to FIGS. 2 through 11. Component parts or elements like or similar to those illustrated in FIG. 1 are designated by the same or like reference numerals, and the description thereof are therefore omitted.

Figure 4:
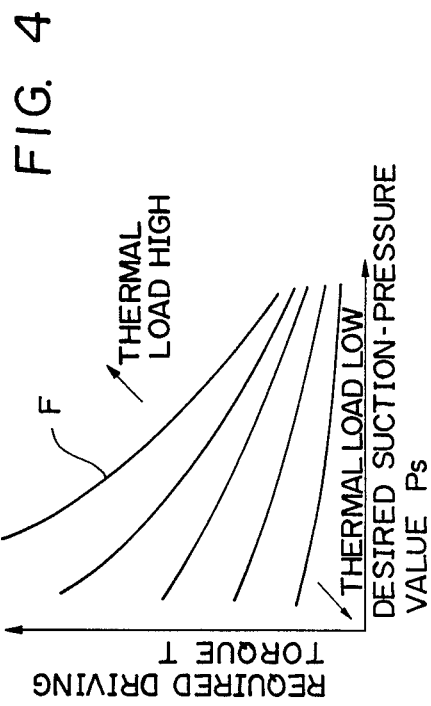
FIG. 4 is a graphical representation of the relationship between required driving torque and desired suction-pressure.
Figure 2:
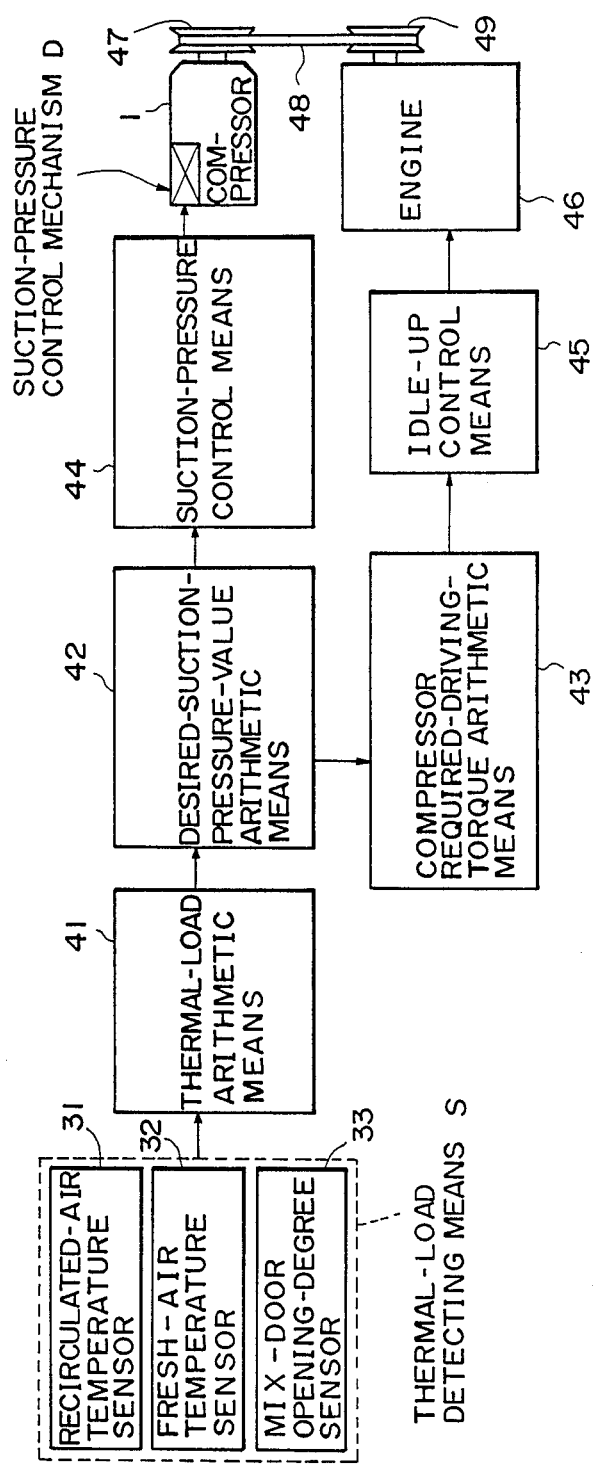
FIG. 2 is a block diagram showing an arrangement of an air conditioning system for automotive vehicles, according to an embodiment of the invention.
Figure 5:
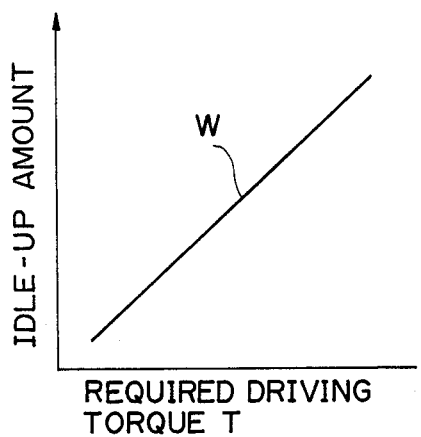
FIG. 5 is a graphical representation of the relationship between an idle-up amount and the required driving torque.
Figure 6:
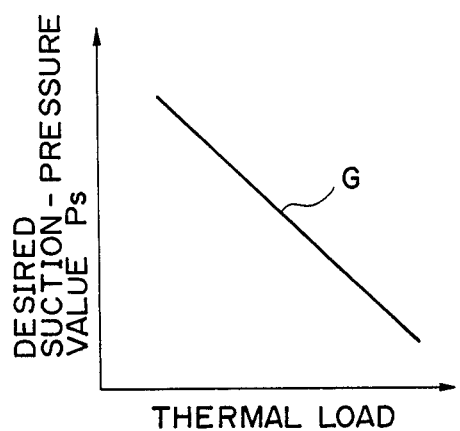
FIG. 6 is a graphical representation of the relationship between the desired suction-pressure and thermal load.
Figure 7:
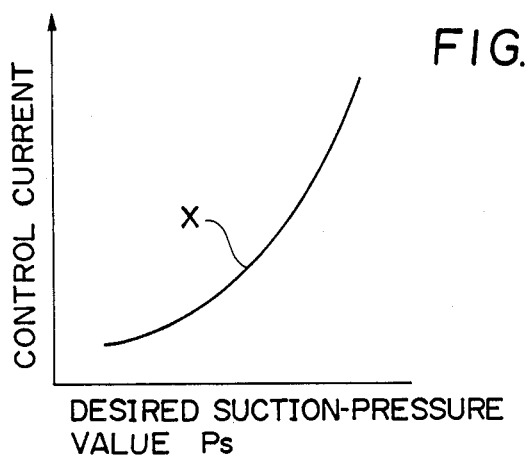
FIG. 7 is a graphical representation of the relationship between control current and the desired suction-pressure.

Referring first to FIG. 2, there is shown an air conditioning system for automotive vehicles, according to an embodiment of the invention. In the air conditioning system, thermal-load arithmetic means 41 calculates a thermal load acting on the system, on the basis of an output from thermal-load detecting means S which is composed of a recirculated-air temperature sensor 31, a fresh-air temperature sensor or pyrheliometer 32, a mix-door opening-degree sensor 33 and so on. Suction-pressure arithmetic means 42 calculates a desired or target value Ps of suction pressure of the compressor 1 on the basis of an output from the thermal-load arithmetic means 41 in accordance with a predetermined suction-pressure vs. thermal-load characteristic G shown in FIG. 6. Required-driving-torque arithmetic means 43 is provided for calculating a value of torque T required for driving the compressor 1, that is, minimum required driving torque for the compressor 1, in accordance with the desired suction-pressure Ps value, on the basis of a predetermined required-driving-torque vs. suction-pressure characteristic F which is set in accordance with the magnitude of the thermal load as shown in FIG. 4. Suction-pressure control means 44 controls the suction-pressure control device or actuator D by determining the magnitude of control current supplied to the device D in accordance with a predetermined control-current vs. suction-pressure characteristic X which is set in relation to the desired suction-pressure Ps value as shown in FIG. 7. Idle-up control means 45 controls the rotational speed of an engine 46 at idling on the basis of an output from the arithmetic means 43 in accordance with a predetermined idle-up-amount vs. required-driving-torque characteristic W which is set in relation to the required driving torque T for the compressor 1 as shown in FIG. 5. The above-mentioned various means 41 through 45 are constituted by a microcomputer. The output from the engine 46 is transmitted to the compressor 1 through a transmission mechanism which includes a pulley 49 mounted on an output shaft of the engine 46 for rotation therewith, a pulley 47 mounted on a drive shaft of the compressor 1 for rotation therewith, and a drive belt 48 extending between and around the pulleys 49 and 47.

The predetermined suction-pressure vs. thermal-load characteristic G shows a desired value of the suction pressure Ps of the compressor 1 to be set with respect to the thermal load 82. The thermal load 82 varies depending upon the temperature and humidity within the vehicle compartment, the temperature and humidity of the fresh air, and the opening degree of the mix-door. When the thermal load lowers, the discharge pressure Pm of the evaporator 80 is also lowered so that it is necessary to raise the desired suction-pressure Ps value of the compressor 1. On the other hand, as the thermal load increases, the desired suction-pressure Ps value is set to a lower value. The predetermined suction-pressure vs. thermal-load characteristic G is determined beforehand through various experiments. By thus setting the desired suction-pressure Ps value correspondingly to the thermal load, the discharge pressure Pm of the evaporator 80 can be maintained constant so that the cooling capacity can be maintained constant.

The air conditioning system for automotive vehicles constructed as above according to the invention operates in accordance with a program shown in FIG. 3.

A signal representative of a thermal load acting upon the system is inputted, at a step S1, to the thermal-load arithmetic means 41 from the thermal-load detecting means S. The thermal load is calculated at a step S2. At a step S3, the suction-pressure arithmetic means 42 calculates a desired suction-pressure Ps value on the basis of the calculated thermal load, in accordance with the predetermined suction-pressure vs. thermal-load characteristic G.

It is judged at a step S4 whether or not the engine is in an idling state. If the judgment at the step S4 is negative, that is, if the engine is in a normal running state, the program jumps to a step S8 where a control current value is calculated by the suction-pressure control means 44 on the basis of the desired suction-pressure Ps value in accordance with the control-current vs. suction-pressure characteristic X. Responsive to the calculated control-current value, the suction-pressure control device D is so controlled that the suction pressure of the compressor is made equal to the desired suction-pressure Ps value. Thus, the temperature, humidity and so on within the vehicle compartment can be regulated to respective satisfactory levels by the air conditioning system.

If the judgment at the step S4 is affirmative, that is, if the engine is in the idling state, the program proceeds to a step S5 where a required driving torque T value is calculated by the required-driving-torque arithmetic means 43 on the basis of the calculated thermal load and the desired suction-pressure Ps value in accordance with the required-driving-torque vs. suction-pressure characteristic F. At a step S6, an idle-up amount, i.e. the amount by which the engine rotational speed is to be raised, is calculated by the idle-up control means 45 on the basis of the calculated required driving torque T in accordance with the idle-up-amount vs. required-driving-torque characteristic W. At a step S7, the engine rotational speed is raised by the calculated idle-up amount so that the suction pressure of the compressor is made equal to the desired suction-pressure value Ps at the step S8. Thus, the temperature, humidity and so on within the vehicle compartment can be regulated to respective satisfactory levels by the air conditioning system. In this manner, the engine rotational speed is controlled in accordance with the capacity of the compressor 1 at idling of the engine.

As described above, at idling of the engine, the engine rotational speed is raised only by such an increment as to supply the compressor with just the minimum torque T required for driving the compressor or the minimum required driving torque. Thus, the power can be saved and torque insufficiency can be prevented.

An example of the variable capacity type compressor provided with the pressure control device D will next be described with reference to FIGS. 8 through 11.

Figure 8:
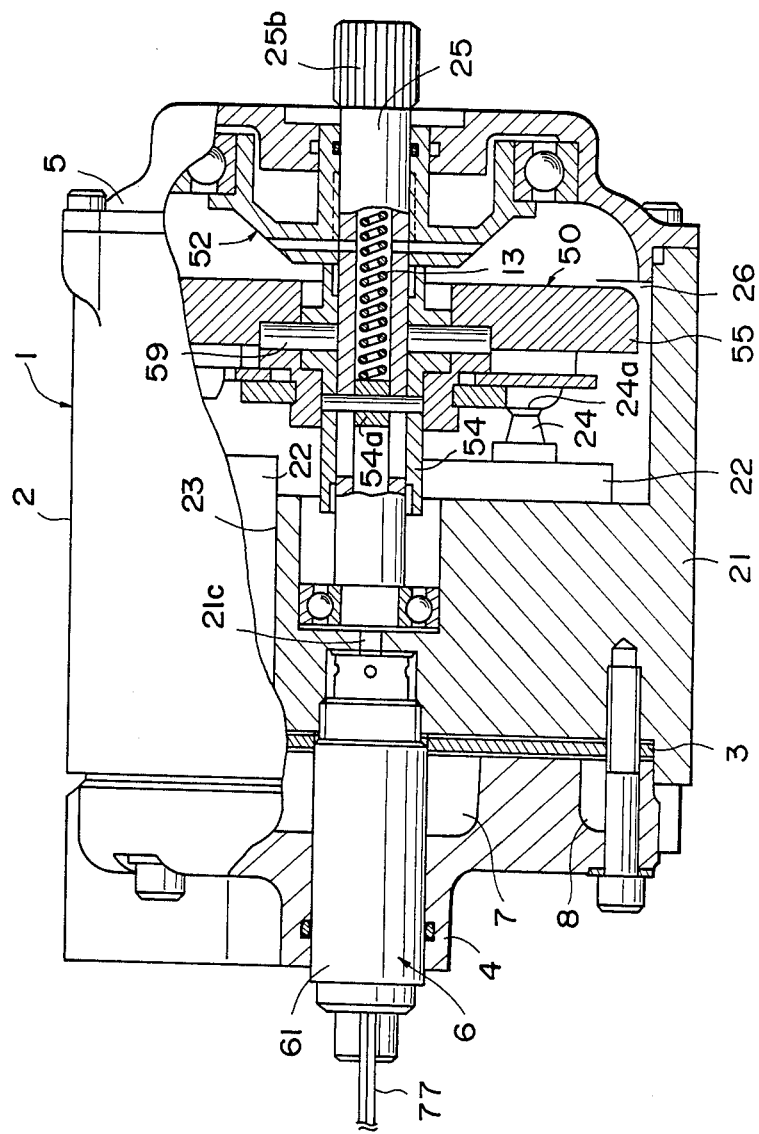
FIG. 8 is a horizontal longitudinal cross-sectional view of a variable capacity type compressor appearing in FIG. 2.

As shown in FIGS. 8 and 9, the compressor 1 comprises a cylindrical casing 2, a cylinder head 4 mounted on one end face of the casing 2 through a valve plate 3 in a gas-tight fashion, and a head member 5 mounted on the other end face of the casing 2 in a gas-tight fashion.

Arranged within the cylinder head 4 is the pressure control device D (see FIGS. 10 and 11) which comprises a pressure regulating valve 6. A suction chamber 7 and a discharge chamber 8 are defined around an outer periphery of the pressure regulating valve 6 within the cylinder head 4. The suction chamber 7 is connected to an outlet of an evaporator (not shown) of a refrigerating circuit of the air conditioning system. The discharge chamber 8 is connected to an inlet of a condenser (not shown) of the refrigerating circuit.

A piston mechanism 20 is arranged within the casing 2 for compression of refrigerant. The piston mechanism 20 is composed of a cylinder block 21, and a plurality of pistons 22. The pistons 22 are arranged about a longitudinal axis of the cylinder block 21 in circumferentially equidistantly spaced relation to each other in such a manner that the axes of the respective pistons 22 extend parallel to the longitudinal axis of the cylinder block 21.

The pistons 22 are fitted respectively in cylinders 23 defined within the cylinder block 21, for sliding movement therein in directions indicated by an arrow K. Piston rods 24 are connected respectively with the pistons 22. Specifically, each piston rod 24 has one end thereof secured to a corresponding one of the pistons 22. The other end of the piston rod 24 is pivotally joined to a corresponding one of a plurality of shoes 27 through a corresponding one of a plurality of ball joints 24a.

A plurality of discharge valves 10 are arranged respectively at ends of respective discharge ports 9 on the side of the discharge chamber 8. The discharge chamber 8 and the cylinders 23 communicate with each other through the respective discharge ports 9. A plurality of suction valves (not shown) are arranged respectively at ends of respective suction ports 11 on the side of the cylinders 23. The suction chamber 7 and the cylinders 23 communicate with each other through the respective suction ports 11.

With the above arrangement of the piston mechanism 20, low-pressure refrigerant within the suction chamber 7 is drawn into each cylinder 23 through a corresponding one of the suction ports 11 and a corresponding one of the suction valves, the piston 22 associated with the cylinder 23 compresses the drawn refrigerant, and the compressed high-temperature and high-pressure refrigerant is discharged into the discharger chamber 8 through a corresponding one of the discharge ports 9 and a corresponding one of the discharge valves 10.

A crank chamber 26 is defined within the casing 2, in which is arranged a drive mechanism 50 for driving the piston mechanism 20. The drive mechanism 50 comprises a drive shaft 25 extending along a longitudinal axis of the compressor 1 for rotation about the longitudinal axis, an arm member 52 rigidly fitted on one end of the drive shaft 25 for rotation therewith, a slider 54 arranged about the drive shaft 25, and a wobble plate 55 arranged about the slider 54.

The one end of the drive shaft 25 extends outwardly through the head member 5. Mounted on the outwardly extending end 25b of the drive shaft 25 is the magnet clutch 47 shown in FIG. 2, which is connected to the pulley 49 on the output shaft of the engine 46 through the drive belt 48.

The slider 54 is in the form of a sleeve and is arranged for sliding movement along the drive shaft 25 in axial directions indicated by the arrow K and for rotation with the drive shaft 25. The slider 54 is biased toward the cylinder block 21 by an internal slider 54a and a coil spring 13 which are arranged within the drive shaft 25.

The wobble plate 55 is in the form of a disc and has a central bore 55a which is freely fitted about the slider 54. The wobble plate 55 is connected to the slider 54 through trunnion pins 59 for swinging or wobbling movement thereabout. Accordingly, the wobble plate 55 is biased by the coil spring 13 toward such a direction as to reduce an angle of inclination $\theta$.

As shown in FIG. 9, a pair of parallel guides 55a are secured on a rear end face of the wobble plate 55 on the side of the arm member 52, in a manner projecting from the rear end face of the wobble plate 55, and extend radially of the rear end face and parallel with each other. A coil spring 16 is interposed under tension between the guide 55a and the arm member 52 such that the rear end face of the wobble plate 55 abuts under the biasing force of the coil spring 16 against a cam face 52c at a front end of the arm member 52.

During rotation of the wobble plate 55 about the axis of the drive shaft 25, the wobble plate 55 is swung in directions indicated by an arrow H about the cam surface 52c in such a manner that the angle $\theta$ with respect to the vertical plane varies within a predetermined range.

The shoe 27 connected to the piston rod 24 of each piston 22 through the ball joint 24a abuts against the front end face of the wobble plate 55 for circumferential sliding movement relative thereto.

When, during rotation of the wobble plate 55, a portion of the wobble plate 55, which abuts against the cam face 52a, approaches any one of the cylinders 23, the piston 22 of the cylinder 23 is slidingly moved toward the cylinder head 4 to compress the refrigerant and discharge the compressed refrigerant into the discharge chamber 8. On the other hand, when the above-mentioned portion of the wobble plate 55 is moved away from the cylinder 23, the piston 22 is slidingly moved toward the head member 5 to draw refrigerant into the cylinder 23 from the suction chamber 7. The angle of inclination $\theta$ of the wobble plate 55 with respect to the vertical plane varies depending upon the difference between the pressure Pd within the cylinders 23, that is, the reaction forces from the respective pistons 22 and the sum of the pressure Pc of the blow-by refrigerant leaking into the crank chamber 26 and the biasing force of the coil spring 13. The variation in the angle of inclination $\theta$ causes the stroke of each piston 22 to increase and decrease so that the discharged and drawn amounts of the refrigerant increase and decrease.

The pressure regulating valve 6 is arranged within the cylinder head 4, for regulating the pressure within the crank chamber 26 to control the angle of inclination $\theta$ of the wobble plate 55.

As shown in FIGS. 10 and 11, the pressure regulating valve 6 comprises a casing 61, and a valve body 62. The valve body 62 is so designed as to open and close a communication port 21c between the suction chamber 7

(the low-pressure refrigerant side) and the crank chamber 26. The valve body 62 has a pressure receiving face 62a which receives the pressure within the suction chamber 7. An electromagnetic actuator 68 has a solenoid 63 which is energized by control current supplied from the suction-pressure control means 44 through a cable 77 on the basis of signals from the thermal-load detecting means S which include the respective state signals from the recirculated-air temperature sensor 31, the fresh-air temperature sensor or pyrheliometer 32, and the mix-door opening-degree sensor 33. When the solenoid 63 is energized, a movable core 64 is moved toward a stationary core 66 under the biasing force of a coil spring 65, to control the opening degree of the valve body 62 through a transmission rod 67. The transmission rod 67 is arranged between the valve body 62 and the movable core 64 and is fitted in the stationary core 66 and a support plate 69 for sliding movement relative thereto, to transmit displacement of one of the valve member 62 and the movable core 64 to the other. The transmission rod 67 has also such a function as to set the positional relationship, i.e., a gap Z, between the movable core 64 and the stationary core 66. A bellows 78 is arranged about the transmission rod 67, and is assembled with the valve body 62 by means of brazing, soldering or the like. A spring retainer 74 for the coil spring 65 is threadedly fitted on a screw rod 75, in such a manner that the spring retainer 74 can be altered in position along the screw shaft 75 to adjust the biasing force of the coil spring 65 which abuts the spring retainer 74.

When the solenoid 63 is not supplied with electric current, that is, when the electromagnetic actuator 68 is turned off, the opening degree of the valve body 62 is determined by the difference between the respective biasing forces of the coil spring 65 and the bellows 78 and the pressure Ps within the suction chamber 7. Normally, when the solenoid is deenergized, the valve opening pressure, i.e. suction pressure, which is higher than the sum of the biasing forces of the members 65, 78, overcomes the latter so that the valve body 62 is in its open position. On this occasion, since the discharge pressure Pm of the evaporator 80 varies depending upon the thermal load 82, and the evaporating pressure of the refrigerant substantially varies because of a pressure loss between the evaporator 80 and the compressor 1, a desired cooling capacity is not obtained. Therefore, the solenoid 63 is supplied with electric current controlled by the suction-pressure control means 44. Specifically, when the electromagnetic actuator 68 is in an on state, the opening degree of the valve body 62 is determined by the attracting force of the stationary core 66 varying depending upon the current value supplied to the solenoid 63 and acting to bring the valve body 62 toward a closed position through the movable core 64, the respective biasing forces of the coil spring 65 and the bellows 78 which are hence increased, and the pressure Ps within the suction chamber 7. The opening degree of the valve body 62 is thus corrected by the electromagnetic actuator 68 to regulate the pressure Pc within the crank chamber 26. Thus, the angle of inclination $\theta$ of the wobble plate 55 is controlled, thereby regulating the discharged and drawn amounts of refrigerant.

For example, when the thermal load 82 lowers, the discharge pressure Pm and temperature of the evaporator 80 are both lowered. As a result, the current supplied to the solenoid 63 by the suction-pressure control means 44 is increased, so that the attracting force of the stationary core 66 is raised to reduce the opening degree of the valve body 62. Accordingly, the pressure Pc within the crank chamber 26 is raised, and the angle of inclination $\theta$ of the wobble plate 55 decreases so that the discharge and suction amounts or capacity of the compressor 1 is decreased. Since the suction amount of the compressor 1 is thus reduced, the discharge pressure Pm of the evaporator 80 rises. Further, since the discharge amount of the compressor 1 is also reduced, the flow rate of refrigerant from the compressor 1 to the evaporator 80 is reduced, and hence the pressure loss between the compressor 1 and the evaporator 80 is reduced, so that the pressure Pm within the evaporator 80 is maintained constant. On the other hand, when the thermal load increases, the discharge and suction amounts of the compressor 1 increase in a manner reverse to that described above, so that the pressure Pm is maintained constant.

In the manner described above, the pressure regulating valve 6 is controlled by the suction-pressure control means 44 such that the evaporating pressure is made constant regardless of variation in the thermal load under the same setting condition. Thus, it is possible to keep the desired cooling condition.

As described above, the air conditioning system for automotive vehicles, according to the invention, operates such that the suction-pressure control device D is controlled by the suction-pressure control means 44 so that not only the desired cooling condition can be maintained, but also the engine rotational speed can be set in compliance with the compressor capacity by the idle-up control means 44 when the engine is at idling, by calculating the desired suction-pressure Ps value on the basis of the thermal load in accordance with the predetermined suction-pressure vs. thermal-load characteristic G, calculating the torque T required for driving the compressor on the basis of the calculated desired suction-pressure Ps value, and setting the engine rotational speed on the basis of the calculated required driving torque. Therefore, the engine rotational speed can be exactly raised by an increment just corresponding to the minimum torque T required for driving the compressor, to thereby prevent an excessive increase in the engine rotational speed and hence wasteful consumption of the fuel, as well as to prevent an insufficient increase in the engine rotational speed and hence insufficient torque which can result in engine stalling.

What is claimed is:

1. In an air conditioning system for an automotive vehicle having an engine installed therein, said air conditioning system having a variable capacity type compressor, thermal-load detecting means for detecting a thermal load on the system, suction-pressure arithmetic means for calculating a desired value of suction pressure of the compressor on the basis of an output from said thermal-load detecting means in accordance with a predetermined suction-pressure vs. thermal-load characteristic, suction-pressure changing means for changing the suction pressure of the compressor, and suction-pressure control means for controlling said suction-pressure changing means on the basis of an output from said suction-pressure arithmetic means, the improvement comprising:

required-driving-torque arithmetic means for calculating a value of torque required for driving the compressor, on the basis of the output from said suction-pressure arithmetic means and said detected thermal load in accordance with a predetermined required-driving-torque vs. suction-pressure characteristic; and idle-up control means for setting the rotational speed of said engine at idling on the basis of an output from said required-driving-torque arithmetic means.

2. An air conditioning system according to claim 1, wherein said suction-pressure vs. thermal-load characteristic is such that as the thermal load increases, said desired suction-pressure value decreases.

3. An air conditioning system according to claim 1, wherein said required-driving-torque vs. suction-pressure characteristic is such that as the desired suction-pressure value increases, said value of torque required for driving the compressor decreases, and that as the thermal load increases, said value of torque required for driving the compressor increases.

4. An air conditioning system according to claim 1, wherein said idle-up control means sets the rotational speed of said engine at idling to higher values as said value of torque required for driving the compressor increases.

5. An air conditioning system according to claim 2, wherein said idle-up control means sets the rotational speed of said engine at idling to higher values as said value of torque required for driving the compressor increases.

6. An air conditioning system according to claim 3, wherein said idle-up control means sets the rotational speed of said engine at idling to higher values as said value of torque required for driving the compressor increases.

* * * * *